UNITED STATES PATENT OFFICE.

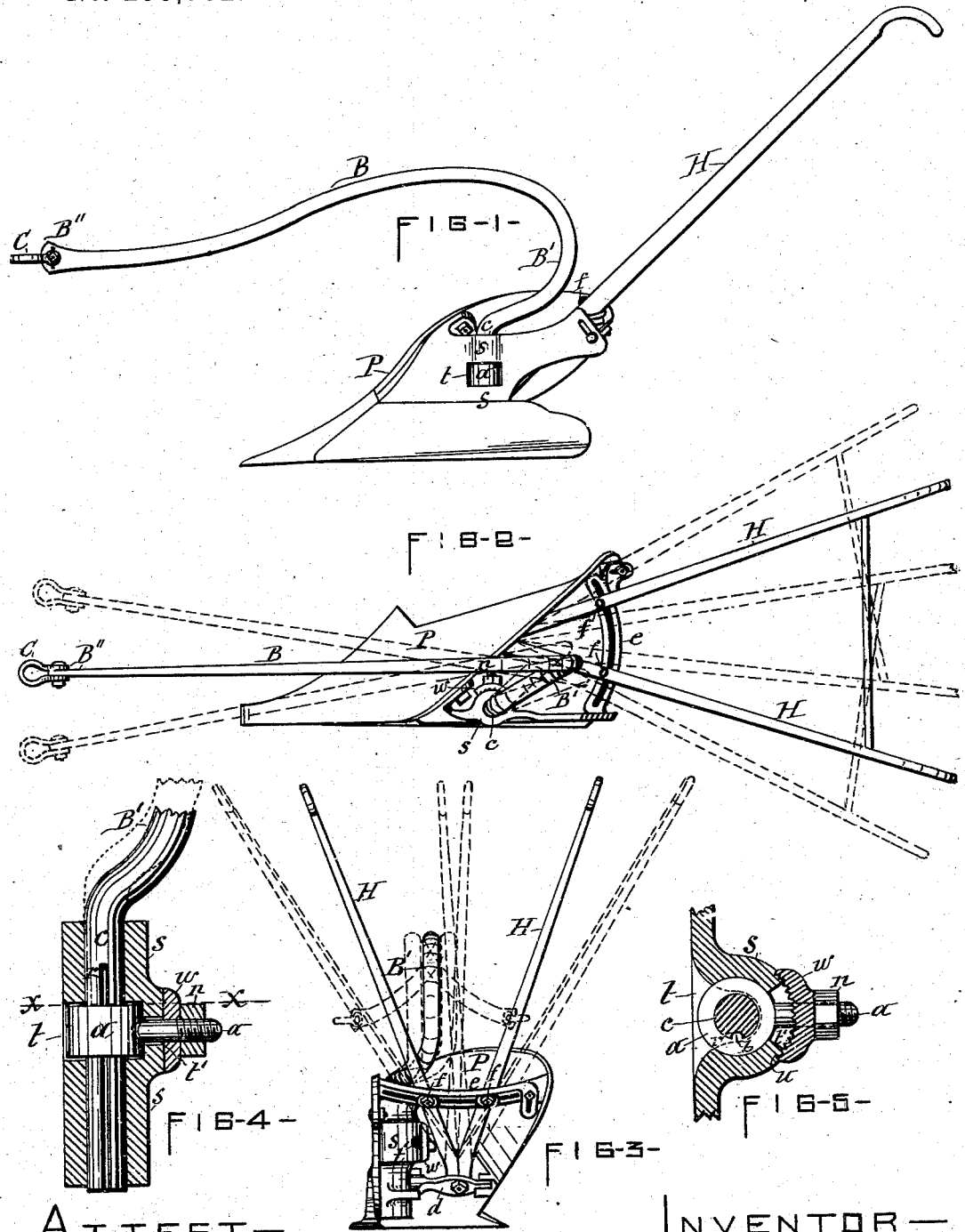

HARRY WIARD AND WILLIAM R. BULLOCK, OF SYRACUSE, NEW YORK.

PLOW.

SPECIFICATION forming part of Letters Patent No. 295,702, dated March 25, 1884.

Application filed November 5, 1883. (No model.)

*To all whom it may concern:*

Be it known that we, HARRY WIARD and WILLIAM R. BULLOCK, of Syracuse, in the county of Onondaga, in the State of New York, have invented new and useful Improvements in Plows, of which the following, taken in connection with the accompanying drawings, is a full, clear, and exact description.

This invention relates to the class of plows which have the beam and handles arranged adjustable in their positions, so as to allow the plow to be guided with accuracy and convenience in the requisite proximity to the plants to be cultivated; and the invention consists in certain peculiarities of the detail construction of the aforesaid adjustable parts of the plow, all as hereinafter more fully described, and specifically set forth in the claims.

In the annexed drawings, Figure 1 is a side elevation of our improved plow. Figs. 2 and 3 are respectively plan and rear views of the same, illustrating the adjustability of the plow beam and handles. Fig. 4 is an enlarged vertical section of the attachment of the plow-beam to the plow; and Fig. 5 is a horizontal transverse section of the same, taken on line $x$ $x$ in Fig. 4.

Similar letters of reference indicate corresponding parts.

P denotes a plow of ordinary form, B the plow-beam, and H the handles. The beam we construct of a round bar of wrought-iron or steel, preferably the latter, which bar we bend, so as to form a vertical shank, $c$, at the rear end, thence rearwardly, laterally, and upwardly from said shank, as shown at B', and thence forwardly and somewhat downwardly, and terminate it with a vertically-flattened portion, B", which is provided with holes for the attachment of the usual clevis, C. A plow-beam thus constructed presents a smooth rounded exterior from the place of the attachment of the clevis rearward, and is devoid of projections and of rough or sharp edges, which are liable to injure the plants with which the plow comes in contact. The curved elevated rear portion, B', of the beam tends to gently push the plants to one side, and allow them to reassume their natural position after the plow has passed them without danger of injuring said plants.

The plow P is provided on the interior of its landside with a vertical cylindrical socket, $s$, preferably cast thereon, in which socket the cylindrical supporting arm or shank $c$ of the plow is stepped and fitted to allow said shank to rotate therein, and thus afford a laterally-oscillating movement to the beam, which movement is limited, so as to retain the beam at different angles from or parallel with the range of the plow by the following instrumentalities: The socket $s$ is provided in opposite sides with two openings, $t$ $t'$, one of which is large enough to admit an eyebolt, $a$, which is introduced endwise and set with its eye in co-incidence with the interior of the socket, the screw-threaded shank of said eyebolt protruding through the opening $t'$, which is horizontally elongated to allow the eyebolt to turn a limited distance in the plane of its eye. The exterior of the socket at the side having the opening $t'$, is provided with serrations $u$, and on the protruding shank of the eyebolt is a washer, $w$, which is serrated on the side facing the serrations $u$ of the socket. A nut, $n$, applied to the end of the shank of the eyebolt and pressing the washer $w$ against the serrated socket $s$, serves to retain the eyebolt in its position. The interior of the eyebolt is provided with a feather, $b$, which engages a vertical groove, $r$, in the plow-beam shank $c$, which passes through said eye, as illustrated in Figs. 4 and 5 of the drawings. The plow-beam is thus restrained from lateral movement by the clamping of the eyebolt in the manner aforesaid. By loosening the eyebolt the beam can be swung horizontally into different angles of deflection from the range of the plow, as represented by dotted lines in Fig. 2 of the drawings, and by tightening the eyebolt said beam can be clamped in the desired position to cause the plow to either be drawn close to the row of plants to cast the earth away from them, or operate a proper distance from the plants to cast the earth toward them, or pass central between the rows of plants, for which latter operation the beam is set parallel with the range of the plow, as shown by full lines in Fig. 2 of the drawings, and when thus set the lateral bend of the beam directly above the shank $c$ thereof brings the main portion of the beam nearly in line with the center of the plow.

It will be observed that when the eyebolt $a$ is loosened the shank $c$ is allowed to slide vertically in the socket s, and the plow-beam can thus be raised or lowered bodily, to accommodate it to the height of the horse to be hitched thereto, and by tightening the nut on said eyebolt the portions of the shank c above and below the eyebolt become crowded against the side of the socket, and the plow-beam is thus sustained at the desired elevation, as represented by dotted lines in Fig. 4 of the drawings. The handles H are pivoted at their forward extremity to a rock-shaft or oscillatory cross-bar, d, which is removably seated in bearings on the inner sides of the plow. The free ends of the handles are supported by a cross-plate, e, which is adjustably attached to the rear end of the plow, so as to admit of setting the rear end or free end of the handles higher or lower to suit the operator. The pivot of the forward end of the handles allows them to be shifted laterally, as illustrated by dotted lines in Figs. 2 and 3 of the drawings.

By means of bolts f f, connected with the handles and projecting through a longitudinal slot in the cross-plate e, and provided at the under side of the latter with a nut, the handles can be secured in proper position to enable the operator to conveniently guide the plow in the various positions in which it is adapted to operate, as before described. The aforesaid cross-plate e has heretofore been made horizontal or straight. The consequence was that in carrying the handles to either side from the center of the bar the free ends of the handles moved in an arc which threw one handle lower than the other, and rendered the same inconvenient to the operator. To obviate this defect, we curve the plate e in the form of a segment of the base of a cone whose apex is at the pivot of the forward end of the handles, the axis of the aforesaid cone being inclined rearward, so as to produce a downward deflection or depression in the plane of the plate e, which depression serves to maintain the ends of the handles level or at a uniform elevation in relation to each other in their lateral adjustment, as illustrated in Fig. 3 of the drawings.

Having described our improvements, what we claim as new, and desire to secure by Letters Patent, is—

1. In combination with a plow and handles pivoted at their forward end on said plow, as shown, a handle-supporting plate extended across the rear portion of the plow, and having its central or intermediate portion depressed or deflected downward, to carry the handles at a uniform elevation in relation to each other in their lateral adjustment, substantially as specified and shown.

2. A plow-beam formed of a metal bar terminating at the rear end with a vertical cylindrical shank, in combination with a plow provided with a vertical cylindrical socket or step for the reception of said beam-shank, and an adjustable clamping device connected with said socket, to confine the beam at different elevations and in different angles in relation to the line of draft, substantially as described and shown.

3. In combination with the plow-beam provided with a vertical cylindrical supporting-arm and a vertical groove in said arm, the plow provided with a vertical cylindrical socket and with openings in the side of said socket, an eyebolt adapted to pass through said openings and to carry its eye in range with the socket, and provided with a feather to engage with the groove of the beam-supporting arm, and a clamping-nut on the end of the eyebolt protruding through the side of the socket, substantially as described and shown.

4. A plow-beam formed of a round bar of wrought metal bent into the shape of a vertical shank, c, at its rear end, thence rearwardly, laterally, and upwardly, and thence forwardly and downwardly, and having its forward extremity adapted for the attachment of the whiffletree for the attachment of the clevis, substantially as described and shown.

5. In combination with the plow-beam provided with a vertical cylindrical supporting arm or shank, and with a vertical groove in said shank, the plow provided with the vertical socket s, openings t and t' in said socket, and serrations u on the exterior, the eyebolt a, provided with the feather b, the serrated washer w, and nut n, all constructed and combined substantially in the manner specified and shown.

In testimony whereof we have hereunto signed our names and affixed our seals, in the presence of two attesting witnesses, at Syracuse, in the county of Onondaga, in the State of New York, this 2d day of November, 1883.

HARRY WIARD. [L. S.]
WILLIAM R. BULLOCK. [L. S.]

Witnesses:
FREDERICK H. GIBBS,
WILLIAM CHANDLER RAYMOND.